United States Patent Office 3,225,544
Patented Dec. 28, 1965

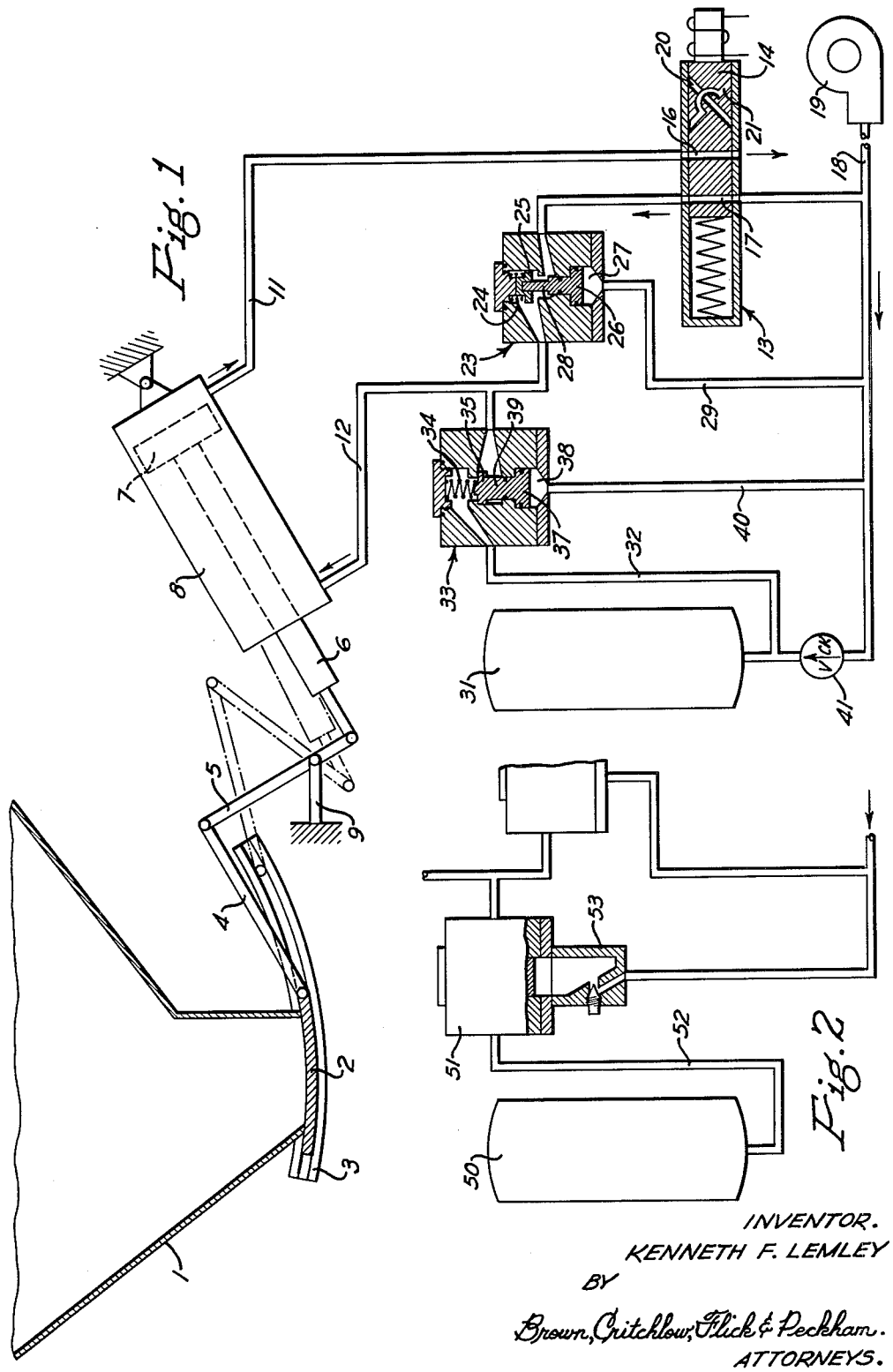

3,225,544
FAIL-SAFE GATE-OPERATING APPARATUS
Kenneth F. Lemley, Pittsburgh, Pa., assignor to Barney Machinery Company, Pittsburgh, Pa., a corporation of Pennsylvania
Filed Dec. 9, 1964, Ser. No. 417,042
4 Claims. (Cl. 60—57)

This invention relates to fluid pressure actuated gate-operating apparatus, and more particularly to such apparatus that will automatically close the gate if the fluid pressure fails.

It is common practice to open and close doors or gates, such as bin gates in steel mills, by fluid pressure cylinders containing pistons connected with the gates. Compressed air is delivered to one end or the other of such a cylinder in order to open or close the gate. In many cases it is necessary that the gate be closed without delay at a certain time. Thus, in a steel mill a bin gate may be opened to deliver material to an underlying receiver, such as a car, and the gate must be closed promptly when a given weight or volume of material has poured out of the bin. This is no problem as long as the gate closing apparatus is operating satisfactorily, but there are occasions when the operator discovers that when he actuates the controls for closing the gate, nothing happens because of a failure of air pressure. This failure may be due to various causes, such as an unusually heavy drain on the compressed air at that time by other apparatus connected with the same compressed air system, or failure of the compressor or a break in the air pressure line. If such a thing occurs, the bin may dump all of its contents before the gate can be closed by some emergency method.

It is an object of this invention to provide emergency means for closing a gate automatically in case of insufficient air pressure to close it in the normal way. Other objects are to provide fail-safe gate-operating apparatus which is simple in construction, dependable in operation, always ready for use, and which acts automatically and immediately when an emergency arises.

In accordance with this invention, a source of compressed air can be selectively connected with either of the pipes connected to the opposite ends of a fluid pressure cylinder containing a piston that is connectable with a gate for opening and closing the gate. There is a normally closed first valve in the pipe that delivers compressed air to the end of the cylinder from which the piston moves to close the gate. This valve contains fluid pressure responsive means for opening it, to which compressed air from the source is delivered in order to hold the valve open during normal operation of the apparatus. A reservoir, which contains compressed air while the apparatus is operating normally, is connected by a conduit to the valved pipe between the valve and cylinder. There is a normally open second valve in this conduit provided with fluid pressure responsive means for closing it, to which compressed air from the source is delivered in order to hold the second valve closed during normal operation of the apparatus. In case there is a predetermined reduction in the air pressure at its source or between it and the first valve, the fluid pressure responsive means of the two valves will move back to their normal positions and permit the first valve to close and the second valve to open so that the reservoir will be connected through the second valve with the cylinder to reverse the piston therein and thereby close the gate.

The invention is illustrated in the accompanying drawings, in which—

FIG. 1 is a schematic view with parts shown in section; and

FIG. 2 is a fragmentary schematic view of a modification.

Referring to FIG. 1 of the drawings, the bottom outlet of a hopper or bin 1 is shown closed by a door or gate 2 that can slide in stationary tracks 3. For reciprocating the gate in order to open and close it, one end of it is pivotally connected by a link 4 to the upper end of a lever 5, the lower end of which is pivotally connected to the outer end of a piston rod 6 attached to a piston 7 in a fluid pressure cylinder 8. The lever is pivotally connected to a suitable support 9. It will be seen that when the piston is moved to the left-hand end of the cylinder the link and lever will pull the gate away from the bottom of the bin to open its outlet. When the piston is returned to the right-hand end of the cylinder the gate will be closed.

For accomplishing these movements of the piston in the cylinder, a pipe 11 is connected to the right-hand end or gate-closed end of the cylinder, while another pipe 12 is connected to the opposite or gate-open end of the cylinder. These pipes may be flexible in whole or in part if desired. Both pipes terminate at control means for selectively connecting a source of compressed air with either of them and for connecting the other pipe with the atmosphere. Such means may include a conventional fluid pressure valve 13 having a solenoid-actuated pilot. As shown, the valve may contain a longitudinally movable valve member 14 provided at one end with a pair of parallel passages 16 and 17 for connecting pipe 11 with the atmosphere and simultaneously connecting pipe 12 with a line 18 leading from a source of compressed air, such as a compressor 19. When the control valve is reversed, a pair of crossed passages 20 and 21 in valve member 14 connect the compressor with pipe 12 and connect pipe 11 with the atmosphere. Thus, by operating this valve, air pressure can be delivered to either end of cylinder 8 in order to move the piston therein back and forth. As described thus far, the apparatus is conventional. It also is satisfactory as long as the necessary air pressure is maintained in line 18.

It is a feature of this invention that if while the gate is open the air pressure in the system should happen to drop below the amount necessary to close the gate, 30 pounds per square inch absolute for example, emergency apparatus will come into operation automatically to move piston 7 towards the gate-closed end of the cylinder. Accordingly, pipe 12 is provided with a first valve 23 that normally is held closed by a coil spring 24 pressing the movable closure member 25 against its seat. However, the valve contains fluid pressure responsive means for opening it, which may be a plunger 26 slidably mounted in a chamber 27 in the bottom of the valve and connected by a stem 28 to the closure member. The bottom of the chamber opens into the upper end of a tube 29 connected with compressed air line 18. As soon as pressure in the line is built up to a predetermined point, it will force the plunger upward in its chamber and thereby open the valve as shown so that compressed air can flow through pipe 12 to cylinder 8 when control valve 13 is in the position shown. When the control valve is reversed, air from the cylinder will escape through valve 23 and the control valve to the atmosphere. As long as the gate-operating apparatus is in use and functioning properly, valve 23 will remain open, the same as if it were not present.

Also connected with the compressed air line 18 is a reservoir 31, which is charged with compressed air from the compressor. This reservoir is connected by a conduit 32 with pipe 12 between valve 23 and cylinder 8. This conduit contains a second valve 33 that normally is held open by a coil spring 34 pressing the movable closure member 35 away from its seat. This valve likewise contains fluid pressure responsive means, which may be in the form of a plunger 37 in a chamber 38 in the bottom of the valve, the plunger being connected by a stem 39 to the movable closure member above it. The bottom of chamber 38 is connected by a tube 40 to compressed air line 18, so that while the compressor is operating, the air pressure against the bottom of the plunger will hold the plunger in its upper position and thereby close the valve. It will be seen that this valve will remain closed as long as the gate-operating apparatus is operating normally, so air cannot escape from reservoir 31 through conduit 32. It cannot escape back through line 18 in case there is a break in the line, because there is a check valve 41 in the line close to the reservoir.

As explained above, during normal or proper operation of this apparatus, valve 23 is held open and valve 33 is held closed by the compressed air delivered by the compressor through line 18 and tubes 29 and 40. In fact, if there never is a critical failure of air pressure, valve 33 and the reservoir will serve no purpose. However, in case there is a failure of pressure while the gate is open so that it cannot be closed in the normal way by compressed air flowing through valve 23, the drop in pressure below a predetermined value will permit the springs in valves 23 and 33 to immediately close the first valve and open the second valve. The moment valve 33 is opened, compressed air in the reservoir is connected through conduit 32 and pipe 12 with the left-hand end of the operating cylinder to drive piston 7 toward the opposite end of the cylinder and close the gate. After the difficulty that reduced the air pressure has been corrected so that the proper pressure can be built up in the system again, the air from the compressor will reopen valve 23, close valve 33 and recharge the reservoir through check valve 41. The compressed air in the reservoir is then ready to operate the piston again if another emergency should ever arise.

Obviously, the capacity of the reservoir should be great enough to provide sufficient air pressure to force the piston toward the gate-closed end of the cylinder and hold it there. To ensure having sufficient pressure for this purpose and yet not provide a reservoir that is larger than it needs to be, the proper size for the reservoir can be determined in advance. It can be determined by multiplying the air pressure per square inch absolute in the charged reservoir by the volume of the reservoir, and dividing the product by the combined volume of the reservoir and cylinder. The result will be the air pressure per square inch absolute available for shifting the piston in its cylinder. In this way a reservoir can be selected that will provide the desired air pressure for operating the piston.

In the modification shown in FIG. 2, the source of compressed air is not connected directly to the reservoir 50 through a check valve as in FIG. 1. Instead, the reservoir has to be charged by reverse flow through the second valve 51 and conduit 52. This would not be possible with valve 33 in FIG. 1, because the charging pressure beneath its plunger 37 would close that valve. Therefore, in FIG. 2 valve 51 is like valve 33, except that it is provided with conventional delayed action means 53 which will not permit it to close until after the reservoir has been charged with compressed air through that valve. The valve then closes and remains closed until an emergency arises in which the compressed air in the reservoir is needed for closing the gate. This embodiment of the invention avoids the use of a check valve for the reservoir, but it requires the delayed action means for valve 51.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Fail-safe gate-operating apparatus comprising a fluid pressure cylinder, a piston therein, a piston rod attached to the piston and extending out of one end of the cylinder for opening and closing a gate, pipes connected to the opposite ends of the cylinder, a source of compressed air, control means for selectively connecting said source with either of said pipes and connecting the other pipe with the atmosphere to move the piston from one end of the cylinder to the other, a normally closed first valve in the pipe that delivers compressed air to the end of the cylinder from which the piston moves to close the gate, said valve containing fluid pressure responsive means for opening it, means for delivering compressed air from said source to said pressure responsive means to hold the valve open during normal operation of the apparatus, a reservoir containing compressed air while the apparatus is operating normally, a conduit connecting the reservoir with said valved pipe between said valve and cylinder, a normally open second valve in said conduit provided with fluid pressure responsive means for closing it, means for delivering compressed air from said source to the pressure responsive means of the second valve to hold that valve closed during normal operation of the apparatus, a predetermined reduction in the air pressure at said source or between it and said first valve permitting the first valve to close and said second valve to open so that compressed air from the reservoir can reverse the piston.

2. Fail-safe gate-operating apparatus according to claim 1, in which the reservoir is enough larger than the cylinder that when the product obtained by multiplying the air pressure per square inch absolute in the reservoir by the volume of the reservoir is divided by the combined volume of the reservoir and cylinder the answer will be sufficient pressure per square inch absolute to shift the piston to the gate-closed end of the cylinder and maintain it there.

3. Fail-safe gate-operating apparatus comprising a fluid pressure cylinder, a piston therein, a piston rod attached to the piston and extending out of one end of the cylinder for opening and closing a gate, pipes connected to the opposite ends of the cylinder, a source of compressed air, control means for selectively connecting said source with either of said pipes and connecting the other pipe with the atmosphere to move the piston from one end of the cylinder to the other, a normally closed first valve in the pipe that delivers compressed air to the end of the cylinder from which the piston moves to close the gate, said valve containing fluid pressure responsive means for opening it, means for delivering compressed air from said source to said pressure responsive means to hold the valve open during normal operation of the apparatus, a reservoir, a conduit connecting the reservoir with said valved pipe between said valve and cylinder, a normally open second valve in said conduit provided with fluid pressure responsive means for closing it, means for delivering compressed air from said source to the pressure responsive means of the second valve to hold that valve closed during normal operation of the apparatus, a conduit connecting said source of compressed air with the reservoir, and a check valve in said last-mentioned conduit permitting flow of air therethrough only toward the reservoir to charge it with compressed air, a predetermined reduction in the air pressure at said source or between it and said first valve permitting the first valve to close and said second valve to open in order to connect the reservoir with said cylinder to reverse the piston.

4. Fail-safe gate-operating apparatus comprising a fluid pressure cylinder, a piston therein, a piston rod attached to the piston and extending out of one end of the cylinder for opening and closing a gate, pipes connected to the opposite ends of the cylinder, a source of compressed air, control means for selectively connecting said source with either of said pipes and connecting the other pipe with the atmosphere to move the piston from one end of the cylinder to the other, a normally closed first valve in the pipe that delivers compressed air to the end of the cylinder from which the piston moves to close the gate, said valve containing fluid pressure responsive means for opening it, means for delivering compressed air from said source to said pressure responsive means to hold the valve open during normal operation of the apparatus, a reservoir, a conduit connecting the reservoir with said valved pipe between said valve and cylinder, a normally open second valve in said conduit provided with delayed action means for closing it after the reservoir has been charged with compressed air delivered to it from said source through the second valve, said delayed action means being operable by fluid pressure, and means for delivering compressed air from said source to said delayed action means to hold said second valve closed during normal operation of the apparatus, a predetermined reduction in the air pressure at said source or between it and said first valve permitting that valve to close and said second valve to open so that compressed air from the reservoir can reverse the piston.

References Cited by the Examiner
UNITED STATES PATENTS

| | | | |
|---|---|---|---|
| 2,053,461 | 9/1936 | Campbell | 303—63 |
| 2,289,559 | 7/1942 | Turek | 303—63 |
| 2,512,043 | 6/1950 | Stevens | 303—85 |
| 2,871,066 | 1/1959 | Pannier et al. | 303—63 |

EDGAR W. GEOGHEGAN, *Primary Examiner.*